United States Patent [19]

Bothe et al.

[11] Patent Number: 5,252,384
[45] Date of Patent: Oct. 12, 1993

[54] HEAT-SEALABLE PACKAGING FILM

[75] Inventors: Lothar Bothe, Mainz-Gonsenheim; Volker Dolle; Andreas Winter, both of Kelkheim; Thomas Wilhelm, Sulzfeld, all of Fed. Rep. of Germany

[73] Assignee: Hoechst Aktiengesellschaft, Frankfurt am Main, Fed. Rep. of Germany

[21] Appl. No.: 787,108

[22] Filed: Nov. 4, 1991

[30] Foreign Application Priority Data

Nov. 7, 1990 [DE] Fed. Rep. of Germany ....... 4035343

[51] Int. Cl.$^5$ .......................... B32B 5/16; B32B 27/08
[52] U.S. Cl. .................................... 428/212; 428/327; 428/330; 428/331; 428/461; 428/476.9; 428/516; 428/518; 428/910; 428/349
[58] Field of Search ............... 428/212, 327, 330, 331, 428/461, 476.9, 516, 518, 910, 349

[56] References Cited

U.S. PATENT DOCUMENTS

| | | | |
|---|---|---|---|
| 4,345,852 | 8/1992 | Isaka et al. | 428/216 |
| 4,410,582 | 10/1983 | Tsunashima et al. | 428/212 |
| 4,439,478 | 3/1984 | Ferguson et al. | 428/349 |
| 4,572,854 | 2/1986 | Dallmann et al. | 428/35 |
| 4,740,421 | 4/1988 | Suzuki et al. | 428/349 |
| 4,764,425 | 8/1988 | Balloni et al. | 428/331 |
| 4,786,562 | 11/1988 | Kakugo et al. | 428/516 |
| 4,966,933 | 10/1990 | Kawakami et al. | 428/461 |

FOREIGN PATENT DOCUMENTS

| | | |
|---|---|---|
| 0321220 | 6/1989 | European Pat. Off. . |
| 0351391 | 1/1990 | European Pat. Off. . |
| 3247999 | 6/1984 | Fed. Rep. of Germany . |
| 53-045389 | 4/1978 | Japan . |
| 2027720 | 2/1980 | United Kingdom . |
| 1582186 | 12/1980 | United Kingdom . |

OTHER PUBLICATIONS

John A. Ewen, "Mechanisms of Stereo-Chemical Control in Propylene Polymerizations with Soluble Group 4B Metallocene/Methylalumoxane Catalysts, J. Am. Chem. Soc., 1984, 6355–6364.

"Ullmanns's Encyclopedia of Industrial Chemistry", 4th Edition, Vol. 2, pp. 539–553.

Primary Examiner—P. C. Sluby
Attorney, Agent, or Firm—Foley & Lardner

[57] ABSTRACT

A polyolefin film which comprises a polypropylene base layer and at least one top layer comprising a propylene polymer, wherein the base layer is formed of an isotactic polypropylene and the top layer of a copolymer of an o-olefin having 2 to 8 carbon atoms and a syndiotactic propylene, has high sealed-seam strength and excellent optical properties and is useful as, for example, a packaging material.

25 Claims, 1 Drawing Sheet

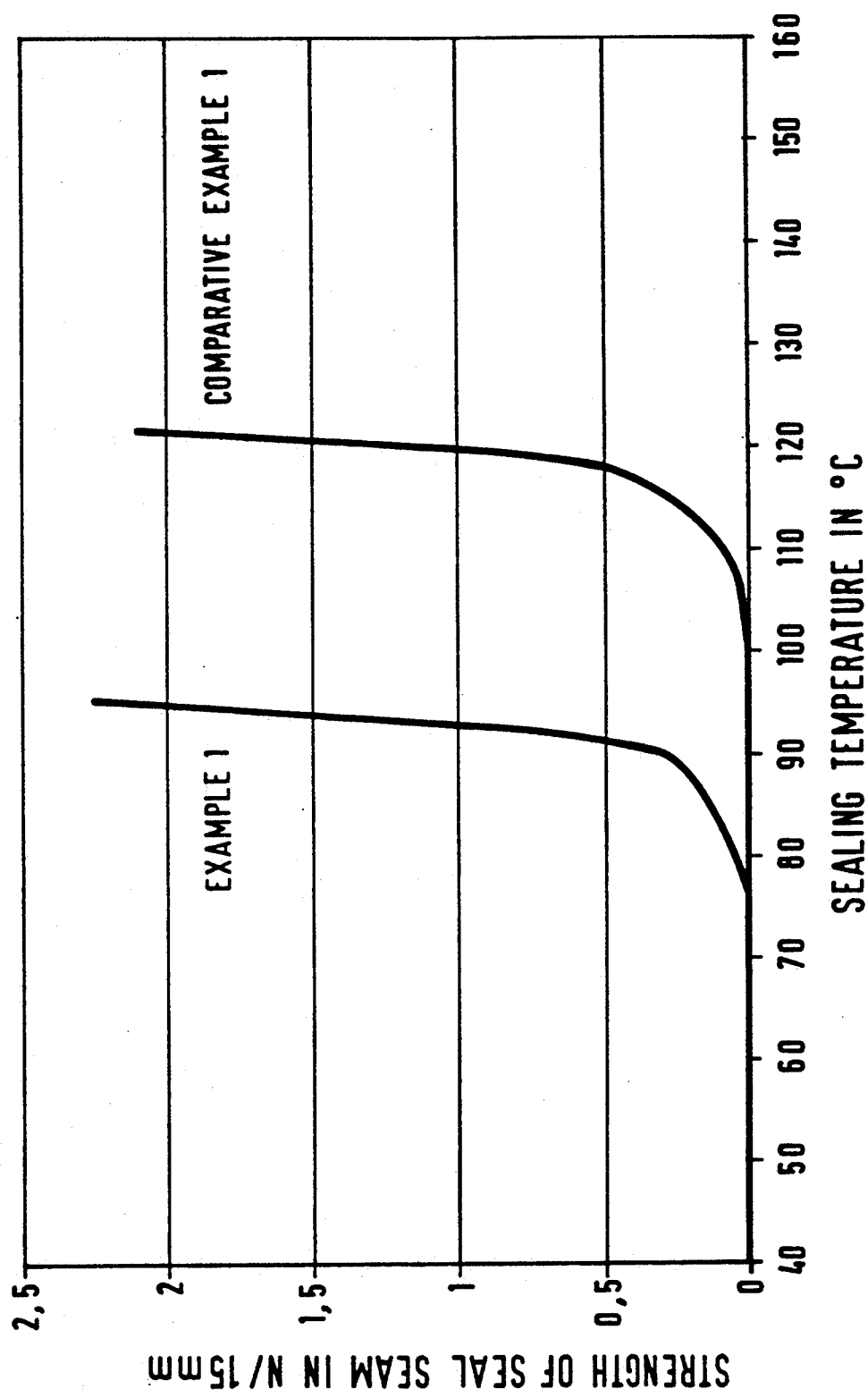

HEAT-SEALABLE PACKAGING FILM

BACKGROUND OF THE INVENTION

The invention relates to a polyolefin film which comprises a polypropylene base layer and at least one top layer of a propylene polymer. Polypropylene films which comprise a polypropylene base layer and polypropylene top layers have been described in many publications. The films described are characterized by favorable properties, in particular, very good optical properties and scratch resistance. It is, however, impossible to process these films on automatic packaging machines, since they exhibit very poor heat-sealing properties. When using oriented films, the temperatures which must be applied for sealing are so high that severe shrinkage occurs in the sealing zone. The packages produced have a poor appearance and an inferior sealed-seam strength. In addition, the printing and coating properties of oriented polypropylene films need improving. A surface treatment of the films, such as corona treatment or flame treatment, may improve these properties, but this improvement is often inadequate or decreases rapidly during storage.

To obviate these disadvantages, oriented polypropylene films are usually provided with so-called sealing layers based on random copolymers of propylene and other α-olefins, polyethylene, or appropriate polymer blends. Such sealing layers have, however, the disadvantage that they impair the optical properties of the oriented polypropylene films. In addition, the heat-sealing properties of these films, in particular in the case of low heat-sealing temperatures, often leave much to be desired.

The coating of polypropylene films with dispersions containing polyvinylidene chloride or various polyacrylates also leads to sealable films, but these films are expensive and have the serious disadvantage that they cannot be reclaimed, i.e., film scrap which is inevitably produced during film production cannot be recycled due to the coating applied to it. For ecological reasons, this disadvantage is no longer acceptable.

SUMMARY OF THE INVENTION

It is an object of this invention to provide a polypropylene film which has both good heat-sealing properties, i.e., high sealed-seam strength at heat-sealing temperatures which are as low as possible, and very good optical properties, i.e., high gloss and high transparency in the case of transparent films, and which can also be returned without difficulty to the production process as reclaim. The film should furthermore exhibit a high scratch resistance and the ability to be surface-treated and the coatability of the film should also be good.

It is also an object of the invention to provide a process for production of the film.

In accordance with the foregoing objects there has been provided a film comprising:

a) a base layer comprising an isotactic polypropylene, and b) at least one additional layer comprising a copolymer of an α-olefin having 2 to 8 carbon atoms and a syndiotactic propylene.

In accordance with another object of the invention there has been provided a process for producing the above film comprising the steps of:

i) coextruding melts corresponding to the individual layers through a flat sheet die so as to produce a multilayer film, ii) solidifying the multilayer film by cooling, iii) biaxially stretching the solidified multilayer film, iv) heat setting the biaxially stretched multilayer film, and optionally v) corona treating one or more of the additional layers of the heat-set film.

Further objects, features, and advantages of the present invention will become apparent from the detailed description of preferred embodiments that follows.

BRIEF DESCRIPTION OF THE DRAWINGS

FIG. 1 compares the sealing temperature and strength of seal of Example 1 according to the present invention and a comparative example.

DETAILED DESCRIPTION OF THE PREFERRED EMBODIMENTS

The base layer of the sealable multi-layer polyolefin film comprises a propylene polymer which preferably is predominantly (at least 90% by weight) comprised of propylene and preferably has a melting point of 140° C. or higher, more preferably a melting point of 150° C. or higher.

Isotactic polypropylene having an n-heptane soluble content of about 15% by weight or less, copolymers of ethylene and propylene having an ethylene content of 10% by weight or less, and copolymers of polypropylene and ($C_4$–$C_8$) α-olefins having a ($C_4$–$C_8$) α-olefin content of 10% by weight or less are preferred examples of the polypropylene polymer used for the base layer.

The propylene polymer of the base layer preferably has a melt flow index of about 0.5 g/10 min to about 8 g/10 min, more preferably about 1.5 g/10 min to about 4 g/10 min, at 230° C. and at a load of 21.6N (DIN 53735).

In a particular embodiment of the invention the base layer can additionally contain up to about 40% by weight, preferably up to about 30% by weight, relative to the total weight of the base layer, of an inert particulate material which preferably has a mean particle diameter ranging from about 0.01 to about 5 μm, more preferably from about 0.02 to about 2.5 μm. The presence of the inert particulate material has the effect that, during stretch-orientation of the film at appropriate temperatures, microcracks and microcavities, so-called "voids", are formed between the polymer matrix and the inert material. In the area of these voids, visible light is refracted and, as a result, opacity is imparted to the film. This makes the film particularly suitable for specific packaging purposes, in particular in the field of food packaging. The inert particulate material can be inorganic or organic. Inorganic materials which are particularly suitable for use are calcium carbonate, aluminum silicate, silicon dioxide, or titanium dioxide. A particularly suitable organic material is polyethylene terephthalate or polybutylene terephthalate. It is also possible to use combinations of inorganic and/or organic particles.

The copolymer of the additional layer preferably has a propylene content of more than 70% by weight, more preferably more than 80% by weight, particularly preferably in the range from 90 to 99% by weight, relative to the total weight of the copolymer. The propylene content of the copolymer preferably possesses an isotacticity of less than 15%, in particular less than 6%. The mean length of sequence $\bar{n}_r$ of the syndiotactic sequences is preferably greater than about 20, more preferably greater than about 25. The molar mass distribution of the copolymer corresponds to the relation $$M_w = k \cdot M_n,$$

where $M_w$ stands for the weight average of the molar mass distribution, $M_n$ stands for the number average of the molar mass distribution and k is a factor which is between about 1 and about 5, in particular between about 2 and about 3.

The weight average is preferably between about 60,000 and about 250,000, in particular between 90,000 and 160,000. The mean molar masses can be determined according to customary methods; of these, the method of gel permeation chromatography has proven to be particularly suitable.

Comonomers which can be used include one or more of α-olefins having 2 to 8 carbon atoms, with ethylene and 1-butene being particularly preferred.

In a particular embodiment of the invention, the film comprises three layers, the base layer carrying top layers on either side thereof. The film may also be equipped with a barrier layer on at least one side, preferably on either side of said three-layered film structure to render it impermeable to oxygen and/or aromatics. Equipped in this manner, the film is suitable for use in packaging extremely sensitive goods, in particular, goods which are susceptible to loss of flavor. The chemical composition of the barrier layers is disclosed in the prior art. The barrier layers comprise layers of metals, polyamides, polyvinyl alcohol, or copolymers containing polyvinyl alcohol. Particularly suitable barrier layers are described, for example, in EP-A-0 118 060.

In order to further improve certain properties of the polyolefin film according to the invention, it is possible for both the base layer and/or the top layer(s) to contain appropriate additives in an effective amount. Preferred additives include antistatic agents, antiblocking agents, lubricants, stabilizers, and/or low-molecular resins, which are in each case compatible with the polymers of the base layer and of the top layer(s).

Preferred antistatic agents include alkali metal alkanesulfonates and polyether-modified polydiorganosiloxanes/Polydialkylsiloxanes, polyalkylphenylsiloxanes and the like and the essentially linear and saturated aliphatic, tertiary amines containing an aliphatic radical having 10 to 20 carbon atoms, which are substituted by omegahydroxyalkyl-($C_1$–$C_4$) groups, amongst which N,N-bis-(2-hydroxyethyl)-alkylamines having $C_{10}$–$C_{20}$ groups, preferably $C_{12}$–$C_{18}$ groups, as the alkyl groups are particularly suitable. The effective amount of antistatic agent is generally within the range from about 0.05 to about 3% by weight, relative to the layer.

Suitable antiblocking agents include inorganic additives, such as silicon dioxide, calcium carbonate, magnesium silicate, aluminum silicate, calcium phosphate, and the like; nonionic surfactants; anionicsurfactants; and/or incompatible organic polymers, such as polyamides, polyesters, polycarbonates and the like. The effective amount of antiblocking agent is generally within the range of from about 0.1 to about 2% by weight, relative to the layer.

Examples of lubricants are higher aliphatic acid amides, higher aliphatic acid esters, waxes, and metal soaps. The effective amount of lubricant is generally within the range from about 0.1 to about 2% by weight, relative to the layer.

Stabilizers which can be employed are the customary compounds which have a stabilizing action on ethylene, propylene, and other α-olefin polymers. The effective amount is, in general, about 0.1 to about 2% by weight, relative to the layer.

The low-molecular resin recommended is a natural or synthetic resin having a softening point of 60° to 180° C., preferably 80° to 130° C. (determined according to ASTM-E 28). Amongst the numerous low-molecular resins, the hydrocarbon resins are preferred, specifically petroleum resins, styrene resins, cyclopentadiene resins, and terpene resins (these resins are described in Ullmanns Enzyklopädie der Techn. Chemie ["Ullmann's Encyclopedia of Industrial Chemistry"], 4th Edition, Volume 2, pages 539 to 553). The effective amount of low-molecular resin is generally about 3 to about 15% by weight, preferably about 5 to about 10% by weight, relative to the layer.

In accordance with a preferred embodiment, the base layer and/or at least one top layer contain an N,N-bis-(2-hydroxyethyl)-($C_{10}$–$C_{20}$)-alkylamine as an antistatic agent.

Further additives can also be added to one or more of the layers. Further suitable additives are compiled, for example, in BGA-Liste VII. Polypropylen [Federal Board of Health List No. VII. "Polypropylene"].

If required, one or more of the top layers can be surface-treated to render them receptive, for example, to printing inks. The surface treatment can be carried out according to one of the methods known in the art. Methods which are known include, for example, electrical spray discharge between two electrodes, i.e., corona treatment, flame treatment, or treatment by means of a polarized flame.

The invention is illustrated by the following example and comparative example:

In each example, a biaxially oriented polypropylene film is prepared, which comprises a polypropylene base layer and a top layer. The film has a total thickness of 20 μm, in which the top layer is 0.7 μm thick.

Preparation is carried out according to the known coextrusion process. The procedure followed is to coextrude the melts corresponding to the base layer and the top layer of the film through a flat-sheet die, the film obtained by coextrusion is cooled for solidification, the film is biaxially stretched (oriented), the biaxially stretched film is heat-set and corona-treated on the top layer intended for corona treatment.

In the example and comparative example, the base layer comprises an isotactic propylene homopolymer which has the following properties:

$M_w = 273,000$ g/mol $M_n = 51,000$ g/mol $M_w/M_n = 5.5$ $i_5 = 19.3$ g/10 min $I = 94.7\%$ $S = 5.3\%$ $\bar{n}_m = 57.0$ $\hat{n} = 3.2$ mm = 93% mr = 3.3% rr = 3.7%

The values given have the significations as indicated below and were measured as follows:

$M_w$ and $M_n$ as indicated above $i_5$ = melt flow index (measured according to DIN 53735 at 230° C. and at a load of 50N)

I = isotactic index (mm + ½mr)

S = syndiotactic index (rr + ½mr)

$\bar{n}_m$ = mean length of isotactic block $$\left(1 + \frac{2\,mm}{mr}\right)$$

$\bar{n}_r$ = mean length of syndiotactic block $$\left(1 + \frac{2\,rr}{mr}\right)$$

mm = percentage of meso blocks mr = percentage of transition areas from meso to racemic rr = percentage of racemic blocks All values referring to stereo regularity were measured with the aid of $^{13}$C-NMR spectroscopy in accordance with J. A. Ewen in J.Am.Chem.Soc. (1984), volume 106, pages 6355–6364.

EXAMPLE 1

The top or sealing layer comprises a syndiotactic ethylene-propylene copolymer, in which the ethylene is present in random distribution. The ethylene content is 4.6% by weight, calculated on the total weight of the copolymer. The syndiotactic propylene content of the copolymer has the following properties:

$M_w$ = 115,000 g/mol $M_n$ = 55,000 g/mol $M_w/M_n$ = 2.1

$i_5$ = 28.0 g/10 min

I = 5.05%

S = 94.95%

$\bar{n}_m$ = 1.5

$\bar{n}_r$ = 28.3 mm = 1.7% mr = 6.7% rr = 91.6%

COMPARATIVE EXAMPLE 1

The top layer comprises an ethylene-propylene copolymer, in which the propylene content is essentially isotactic and which is available from Solvay under the name ELTEX PKS 400 ®. Its ethylene content is also 4.6% by weight, relative to the total weight of the copolymer.

The superior heat-sealing properties of the film according to the present invention (Example 1) are evident from the accompanying Figure. The other physical parameters relating to the film according to Example 1, compared with the film of Comparative Example C1, are indicated in the Table below.

The gloss of the films was determined using a reflectometer from Dr. Lange, Neuss (Federal Republic of Germany); the measuring angle was 85°.

The scratch resistance was determined in accordance with DIN 53 754. To determine the scratch resistance, the Taber model 503 Abraser from Teledyne Taber was employed, using Calibrade R H 18 abrasive wheels at a load of 250 g. Scratch resistance or scratch sensitivity is taken to mean the increase in haze of the scratched film compared with the original film after 50 revolutions of the sample plate. The scratch resistance is termed very good if the increase in haze is <20%, moderate if the increase in haze is 20 to 25%, and poor if the increase in haze is greater than 25%.

The haze of the film was measured in accordance with ASTM-D 1003-52, using a 1° slit diaphragm instead of a 4° pinhole diaphragm, and the haze was indicated in percent for four film layers, one on top of the other. The four layers were selected since the optimum measurement range is thereby utilized. The haze evaluation was carried out with ≦15% = very good, ≧15% to 25% = moderate and >25% = poor.

The films were subjected to an electrical corona treatment under identical conditions. A surface polarity of 40 mN/m was reached in the film of Example 1 while, notwithstanding the identical procedure, the film according to C1 showed a surface polarity of only 39 mN/m.

TABLE

| | Gloss | Scratch Resistance | Haze | Ability to be surface treated | Print-ability |
|---|---|---|---|---|---|
| Ex. 1 | very good | very good | very good | very good | very good |
| C1 | moderate | moderate | good | good | very good |

What is claimed is:

1. A multilayer film which comprises;
   a) a base layer consisting essentially of an isotactic polypropylene, and
   b) at least one additional layer comprising a copolymer of an α-olefin having 2 to 8 carbon atoms and a syndiotactic propylene, wherein the syndiotactic propylene content of said copolymer has an isotacticity of less than about 15%.

2. A multilayer film as claimed in claim 1, wherein said polypropylene has a melting point of about 140° C. or higher 3. A multilayer film as claimed in claim 1, wherein said polypropylene is selected from the group consisting of isotactic polypropylene having an n-heptane soluble content of about 15% by weight or less, copolymers of ethylene and propylene having an ethylene content of about 10% by weight or less, and copolymers of polypropylene and ($C_4$–$C_8$) $\alpha$-olefins having a ($C_4$–$C_8$) $\alpha$-olefin content of about 10% by weight or less.

4. A multilayer film as claimed in claim 1, wherein said base layer contains inert particles having a mean particle diameter of about 0.01 to about 5 $\mu$m, said particles being selected from the group consisting of calcium carbonate, aluminum silicate, silicon dioxide, titanium dioxide, polyethylene terephthalate, polybutylene terephthalate, and mixtures thereof.

5. A multilayer film as claimed in claim 1, wherein said copolymer comprises more than about 70% by weight of propylene.

6. A multilayer film as claimed in claim 1, wherein said isotacticity is less than about 6%.

7. A multilayer film as claimed in claim 1, wherein said $\alpha$-olefin is ethylene or 1-butene.

8. A multilayer film as claimed in claim 1, wherein the mean length of sequence $\bar{n}_r$ of the syndiotactic sequences of said copolymer is greater than about 20.

9. A multilayer film as claimed in claim 8, wherein said mean length of sequences is greater than about 25.

10. A multilayer film as claimed in claim 1, wherein the molar mass distribution of said copolymer corresponds to the following relation:

$$M_w = k \cdot M_n,$$

where
- $M_w$ stands for the weight average of the molar mass distribution,
- $M_n$ stands for the number average of the molar mass distribution and
- k is a factor which is between about 1 and about 5.

11. A multilayer film as claimed in claim 10, wherein k is between about 2 and about 3.

12. A multilayer film as claimed in claim 1, comprising a layer (b) on either side of said base layer (a).

13. A multilayer film as claimed in claim 12, additionally comprising at least one barrier layer comprising metal, polyamide, or polyvinyl alcohol.

14. A multilayer film as claimed in claim 12 comprising one barrier layer on either side of each layer (b).

15. A multilayer film as claimed in claim 1, wherein at least one of said base layer and said additional layer contains an additive selected from the group consisting of antistatic agents, antiblocking agents, lubricants, stabilizers, low-molecular weight resins, and mixtures thereof.

16. A multilayer film as claimed in claim 15, wherein said additive is selected from the group consisting of an N,N-bis-(2-hydroxyethyl)-($C_{10}$–$C_{20}$)-alkylamine, a polyether-modified polydiorganosiloxane, and mixtures thereof.

17. A multilayer film as claimed in claim 1, wherein at least one of said additional layers has been surface-treated to render it receptive to printing inks.

18. A multilayer film as claimed in claim 17, wherein the surface treatment comprises corona, flame, or polarized flame treatment.

19. A multilayer film as claimed in claim 17, wherein the treated surface has a surface polarity of more than about 36 mN/m.

20. A multilayer film as claimed in claim 1, wherein said film is biaxially oriented.

21. A multilayer film as claimed in claim 1, wherein said isotatic polypropylene comprises a homopolymer.

22. A multilayer film as claimed in claim 1, wherein said copolymer consists of at least one of said $\alpha$-olefins and said syndiotactic polypropylene.

23. A packaging film comprising a multilayer film as claimed in claim 1.

24. A multilayer film which comprises:
   a) a base layer consisting essentially of an isotactic polypropylene selected from the group consisting of a polypropylene having an n-heptene soluble content of about 15% by weight or less, copolymers of ethylene and propylene having an ethylene content of about 10% by weight or less, and copolymers of propylene and ($C_4$–$C_8$) $\alpha$-olefins having a ($C_4$–$C_8$) $\alpha$-olefin content of about 10% by weight or less, and
   b) at least one additional layer comprising a copolymer of an $\alpha$-olefin having 2 to 8 carbon atoms and a syndiotatic propylene having an isotacticity of less than about 15%.

25. A multilayer film as claimed in claim 24, wherein said isotatic polypropylene has an isotacticity of greater than about 95% and said syndiotactic propylene has an isotacticity of less than about 6%.

* * * * *